Aug. 22, 1933.   H. C. RENTSCHLER   1,923,844
PHOTO-ELECTRIC DEVICE
Filed Jan. 14, 1931
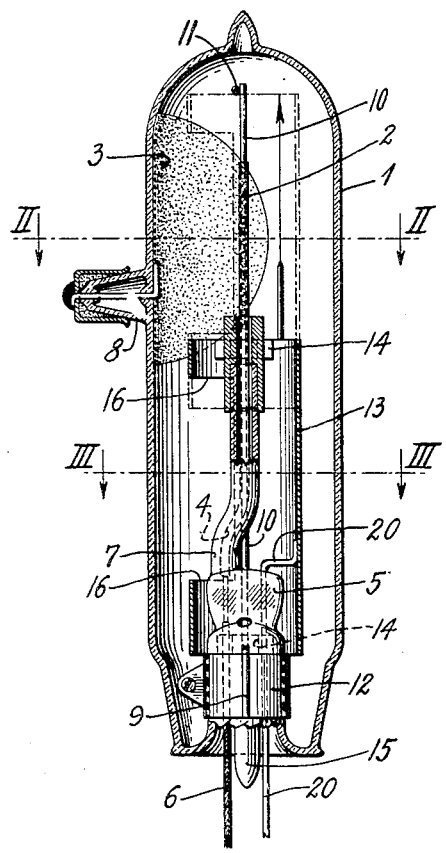
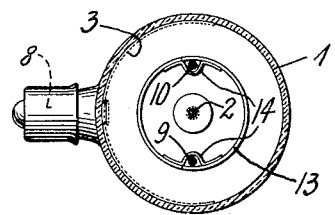
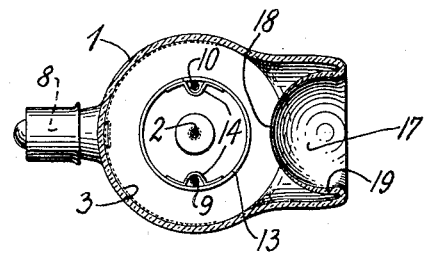
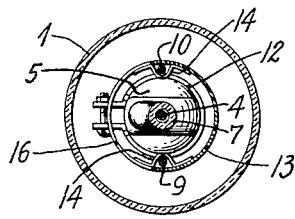
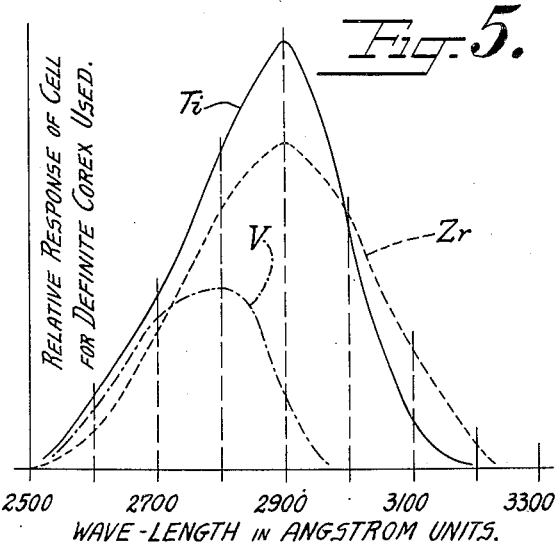
INVENTOR
H. C. RENTSCHLER
BY
ATTORNEY Patented Aug. 22, 1933

1,923,844

UNITED STATES PATENT OFFICE 1,923,844

PHOTO-ELECTRIC DEVICE

Harvey Clayton Rentschler, East Orange, N. J., assignor to Westinghouse Lamp Company, a Corporation of Pennsylvania Application January 14, 1931. Serial No. 508,568

5 Claims. (Cl. 250—27.5)

This invention relates to photo electric tubes and more particularly to photo electric tubes which are sensitive to radiation in the ultra violet region of the spectrum.

In a copending application Serial No. 360,667 filed May 6, 1929, I have described and claimed a photo electric tube in which the sensitivity starts in the blue region of the spectrum and extends into the ultra violet region.

In copending applications Serial No. 360,666 filed May 6, 1929 and Serial No. 370,223 filed June 12, 1929 I have disclosed photo electric tubes sensitive to restricted portions of ultra violet radiation. The latter application has issued into Patent No. 1,815,073 dated July 21, 1931. Such devices are useful in the measuring of preferred or of restricted bands of radiation, and particularly useful in the measurement of radiation lying in the so-called erythema range of radiation having wave lengths approximating 2900 angstrom units.

One of the objects of the present invention is to provided a photo electric tube which is substantially non-sensitive to the entire visible spectrum but which is particularly sensitive to radiation in the erythema range of radiation.

Another object is to produce a photo electric tube which is sensitive only to ultra violet light having a wave length below about 3200 angstrom units.

A further object is to provide an improved method of producing a photo sensitive electrode.

Another object of this invention is to provide a photo sensitive cathode for a photo electric device which is strongly sensitive to radiation of wave lengths less than about 3200 angstrom units.

Other objects and advantages will appear as the description of the invention proceeds.

Heretofore in the production of photo electric tubes for measuring radiation in the ultra violet region, cadmium or zinc have been generally used as the photo sensitive cathode but the photo electric current obtained from cadmium is extremely feeble, requiring for its detection a sensitive electroscope or electrometer or special vacuum tube amplifying means. Moreover the photo sensitivity of cadmium does not extend to radiation of wave lengths greater than about 3000 angstrom units.

In accordance with my invention I have produced a photo electric tube which is sensitive only to ultra violet light and in which the photo electric effect is strong.

I have discovered that the metal zirconium exhibits a "normal" photo electric effect which starts at about 3200 angstrom units, which is well within the ultra violet range, and is non-sensitive to light within the visible region.

When the photo sensitive cathode of a photo electric device is comprised of zirconium the envelope of the tube must be composed at least in part of a material, such as quartz, which is permeable to radiation of wave lengths less than about 3200 angstrom units. If it is desired to restrict the measurement to a narrow band of radiation the envelope may be composed of a glass which is transparent only to such radiation. By properly selecting the composition of the envelope practically any band of radiation below 3200 angstrom units may be measured.

Thus for instance, for erythema treatment, the range of useful rays is restricted to a narrow band each side of about 2900 angstrom units and therefore, in the production of a dosimeter employing a photo electric tube for determining the length of treatment from a given source of ultra violet light, it is necessary that the tube be sensitive to light principally in the region between about 2700 and 3100 angstrom units. For best results the photo electric response of the tube should be as similar as possible to the effect to be measured.

By comprising the envelope of the tube of material which is opaque to radiation of wave lengths below about 2400 angstrom units and utilizing a zirconium photo sensitive cathode, a photo electric device having a maximum sensitivity at about 2900 angstrom units, may be obtained. Such a device would have only a low order of sensitivity to wave lengths appreciably above and below these values. The percent transmission of the envelope for various wave lengths may be varied by changing the thickness of a glass of definite composition and in this manner the peak of the output curve of the tube may, to a limited extent, be varied.

I have found that by employing very thin glass windows for the tube, there is a very great increase in the current output of the tube, particularly to radiation of the lower wave lengths.

When employing relatively thin windows comprised of glass having the composition of Pyrex, which is a commercially known glass that ordinarily is not considered transparent to ultra violet light, the ultra violet transmission of the glass is comparable with that of quartz, at the thickness ordinarily employed except for the short wave length end of the spectrum. The thickness of the Pyrex glass window should be of the order of .01 inches or less for best results.

In producing a photo electric tube in accordance with my invention I preferably employ zirconium for both the anode and cathode although it is to be understood that the anode may be comprised of another metal, such as nickel. The cathode may consist of a sheet of zirconium or it may take the form of a relatively thin coating deposited on the wall of the envelope in contact with a leading in conductor or upon the surface of an electrical conductor. When employed as a coating on the glass envelope, I prefer to first coat the glass, over the portion which is to constitute the cathode, with a noble metal, such as gold, in order to obtain a better contact with the cathode leading in wire.

When employed as a coating upon the surface of an electrical conductor the conductor should preferably be comprised of a metal, such as nickel, and should have a surface thoroughly free of impurities, such as oxides, carbon, nitrides and the like which are deleterious to the photo sensitivity of the zirconium coating.

In order to render the zirconium cathode photo sensitively active it is essential to obtain thereon a surface substantially free of all impurities, such as oxides, carbides, nitrides, etc. This can be most conveniently accomplished by electrically sputtering away the surface of a solid cathode by creating a glow discharge in an inert gas between the anode and cathode. Where a solid cathode is not desired the zirconium may be deposited by such an electrical sputtering means upon the surface of an electrical conductor. In such an electrically sputtered condition the metal appears to have its greatest photo sensitivity.

The construction of the tube and the method of treating and producing the active cathode surface will appear more fully in connection with a detailed description of the accompanying drawing in which Fig. 1 is a side elevational view in section of a photo electric tube embodying the present invention;

Fig. 2 is a cross sectional view taken along plane II—II Fig. 1;

Fig. 3 is a cross sectional view taken along plane III—III Fig. 1;

Fig. 4 is a cross sectional view as taken along plane II—II Fig. 1 showing a modification of the present invention utilizing a relatively thin ray permeable window; and Fig. 5 is a curve showing the current output of a tube plotted against the wave length of the incident ultra-violet light.

Referring to Fig. 1, I have shown a photo electric tube comprising an envelope 1 composed of a material which is transparent to ultra violet light, such as quartz or special ultra violet transmitting glasses having the composition of those glasses known to the trade as Corex, Vitaglass, Uviol, etc.

Within the envelope 1 is mounted a rod shaped anode 2 and a cathode 3 both of which are preferably composed of zirconium. The anode 2 is mounted upon a leading-in conductor 4 extending through press 5 to an external conductor 6. The conductor 4 is enclosed in a dielectric shield member 7 comprised of quartz, glass, porcelain or similar material and restricts the active area thereof to the end portion 2. Only the exposed end of the anode may be comprised of zirconium, if desired.

The cathode 3, preferably comprises a film of zirconium which is deposited upon the enclosing glass envelope of the device in contact with leading in conductor 8 passing through the envelope 1 in the manner shown. The method of depositing the film will be more fully hereinafter disclosed. A film of noble metal, such as gold, for example, may be deposited upon the glass before depositing the zirconium film thereon.

A frame-work consisting of two parallel longitudinally extending wires 9 and 10 and a bracing cross wire 11 is mounted above the press 5 by means of collar 12 frictionally engaging the press 5. Supported on the frame-work is a cylindrical shield 13 enclosing the anode and having means comprising on its inner surface straps or eyelets 14 (Fig. 2) through which the vertical wires 9 and 10 have sliding engagement. By inverting the tube the shield 13 may be moved from one end of the frame to the other. The function of the shield 13 is to protect the walls of the envelope from vaporized or sputtered electrode material during the electrical sputtering of the anode to form the cathode 3.

The shield member 13 has one section thereof as indicated at 16 cut away so that the sputtered electrode material may deposit upon the wall of the envelope to form the cathode. Leading-in wire 20 passes through press 5 and is electrically connected to shield 13.

The photo sensitive cathode is obtained by electrically sputtering the zirconium in a film layer upon the glass surface. The electrode assembly is sealed into the envelope, the envelope is baked out and exhausted in the usual manner heretofore employed to obtain high vacuo and the shield 13 is degasified by high frequency induction heating. A filling of a gaseous medium, such as argon, neon or helium is then introduced within the envelope in any convenient manner as through the exhaust tubing 15. Argon gas at a pressure of about 1 to 6 mm. is preferably employed. The tube is then inverted to position the shield 13 about the electrodes 2 and a glow discharge is created between the electrode 2 and the shield 13 of sufficient current density to effect positive ion bombardment of the electrode and a sputtering or electrical vaporization of the electrode material.

If a direct current discharge is employed the shield 13 of the photo electric tube should serve as the anode for the glow discharge. The glow discharge should be continued until a sufficient deposit of the zirconium is obtained upon the glass wall about the leading in wire 8. I usually continue the discharge for about two hours. This, however, is arbitrary depending upon conditions.

The sputtered material, other than that deposited about leading in wire 8, collects on the interior of the shield 13 and the envelope is maintained clear and free from light obscuring deposits. After the cathode is thus formed, the shield 13 is moved back to the position shown in Fig. 1.

If a gas filling is desired within the tube, the tube may be employed immediately following the glow discharge or if pressure is too high it may be partly exhausted, otherwise the gas must be pumped out completely.

In Fig. 2 I have shown a cross sectional view of the photo electric tube shown in Fig. 1 with the shield 13 in position as shown in Fig. 1. Fig. 3 is a cross section view taken along plane III—III illustrating the position of the opening in shield 13. Fig. 4 is a contemplated modification of the present invention wherein the enclosing envelope is provided with a radiation permeable window 17 of relatively great thinness which is formed by heating up the glass wall of the envelope and drawing it in a bulbous portion having a relatively thin dome 18 and gradually tapering walls 19. The thickness of the window may be about .01 inches although windows of a diameter of about 1 inch and a thickness of only .0001 inches will withstand full atmospheric pressure.

The thin window may be comprised of material which is more transparent to ultra violet light than the remainder of the envelope or may be comprised of material of the same degree of permeability as the envelope. Thus, for instance, the envelope may be composed of an ultra violet transmitting glass, such as Corex, having a thickness of about one thirty-second of an inch and a window of a thickness of about .01 inches.

There is a lesser absorption of the ultra violet light of short wave lengths in the thin window than in the glass of full wall thickness and consequently the current output of the tube is materially increased.

A thin window of the type shown when formed in envelopes of glass ordinarily deemed opaque to ultra violet light, such as ordinary lime glass or Pyrex, readily transmit ultra violet light so that it is unnecessary to employ expensive special ultra violet transmitting glasses or quartz envelopes unless very short ultra violet rays are to be used.

Fig. 5 shows the relation between the wave length of the incident light and the current output of a tube employing an envelope which absorbs the ultra violet light of short wave lengths and a photo sensitive cathode, which is sensitive only to a restricted band of such radiation. Three types of cathodes are illustrated, zirconium, titanium and vanadium, each indicated by their respective chemical symbol.

The short wave side of each curve designates approximately the relationship of the per cent transmission of the ultra violet radiation through the wall of the envelope, the long wave side of each curve the total current or photo electric sensitivity of the cathode, to that radiation which is transmitted by the envelope. Each curve, therefore, is a resultant curve indicating the effect of the energy absorption of the glass on the current output of the tube. The particular glass composition comprising the envelope employed in obtaining these curves is known to the art as Corex glass.

The form of the curves will vary somewhat with different glass composition and may be modified materially by employing glass of different thickness. In the curves shown the maximum sensitivity of the tubes employing the zirconium and titanium cathodes occurs at about 2900 angstrom units. This region of the spectrum is most suitable for erythema treatment and is most desirable to measure. The peak of sensitivity of the vanadium curve with Corex glass lies below this 2900 angstrom units wave length. In the three curves shown the variation in the short wave sections are primarily due to unavoidable variations in the thicknesses of the enclosing envelope.

The peak of each curve may be shifted to the left by using a thinner envelope and thus decreasing the amount of absorption of the lower wave length radiation or it may be shifted to the right to narrow up the band to which the tube is sensitive by increasing the thickness of the envelope. The sensitivity of the device may also be increased by the use of a relatively thin glass window in the envelope.

The envelope may also be comprised of glass having a permeability to radiation that is different to that of Corex glass, if desired, in order to obtain different ranges of sensitivity in the device. It is apparent that where a zirconium cathode is employed the envelope must be permeable to radiation of wave lengths less than about 3200 angstrom units in order to utilize this cathode.

While I have shown several embodiments of my invention it is to be understood that the invention is not limited to such specific embodiments but is susceptible of many changes and modifications and such embodiments are to be considered merely as illustrative of the invention and not in a limiting sense, except in accordance with the appended claims.

What is claimed is:

1. An electron discharge device comprising an envelope transparent to ultra violet light of wave lengths less than about 3200 angstrom units, an anode and a photo sensitive cathode therein, said cathode being composed of zirconium, said cathode being sensitive to substantially all radiations between about 3200 and 2600 angstrom units and substantially insensitive to radiations above about 3300 angstrom units.

2. An electron discharge device comprising an envelope transparent to ultra violet light of wave lengths less than about 3200 angstrom units, an anode and a photo sensitive cathode therein, said cathode comprising a film of zirconium metal on a wall of the envelope, said cathode being sensitive to substantially all radiations between about 3200 and 2600 angstrom units and substantially insensitive to radiations above about 3300 angstrom units.

3. An electron discharge device comprising an envelope transparent to ultra violet light of wave lengths of less than about 3200 angstrom units, an anode and a photo sensitive cathode therein, said cathode comprising a layer of a noble metal having deposited thereon a quantity of zirconium, said cathode being sensitive to substantially all radiations between about 3200 and 2600 angstrom units and substantially insensitive to radiations above about 3300 angstrom units.

4. A photo electric tube comprising an envelope permeable to radiation below approximately 3200 angstrom units, an anode and a photo sensitive cathode therein, sensitive to said radiation and a vitreous window in said envelope, said window having a thickness of from about .0001 inches to about .01 inches.

5. A photo electric tube comprising an enclosing envelope permeable to radiation of wave lengths as low as about 2400 angstrom units and a photo sensitive cathode, sensitive solely to radiation below approximately 3200 angstrom units and to substantially all radiations between about 3200 and 2400 angstrom units, said cathode containing zirconium and being insensitive to radiations above about 3300 angstrom units.

HARVEY CLAYTON RENTSCHLER.